Oct. 9, 1951

E. M. MAXEY ET AL  
HEAT SEALABLE VULCANIZED FILM  
AND METHOD OF MAKING SAME  
Filed Jan. 19, 1950

2,570,829

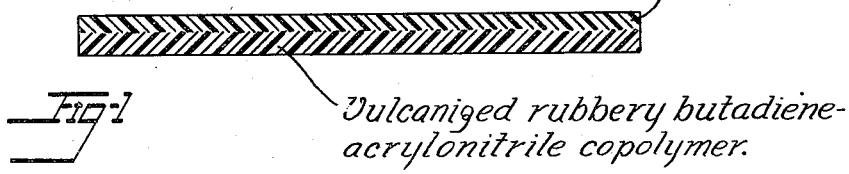

Fig-1

Unvulcanized rubbery butadiene-acrylonitrile copolymer mixed with polyvinyl chloride.

Vulcanized rubbery butadiene-acrylonitrile copolymer.

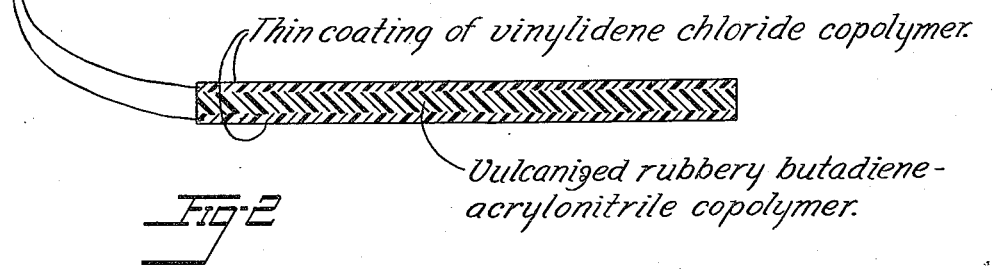

Fig-2

Unvulcanized rubbery butadiene-acrylonitrile copolymer mixed with polyvinyl chloride.

Thin coating of vinylidene chloride copolymer.

Vulcanized rubbery butadiene-acrylonitrile copolymer.

Inventors  
Edwin M. Maxey  
Carroll P. Krupp  
By Robert W. Furlong  
Atty.

Patented Oct. 9, 1951

2,570,829

UNITED STATES PATENT OFFICE 2,570,829

HEAT SEALABLE VULCANIZED FILM AND METHOD OF MAKING SAME

Edwin M. Maxey, Akron, and Carroll P. Krupp, Cuyahoga Falls, Ohio, assignors to The B. F. Goodrich Company, New York, N. Y., a corporation of New York Application January 19, 1950, Serial No. 139,517

15 Claims. (Cl. 154—139)

This invention relates to unsupported film or sheet which has the strength and elasticity of a vulcanized rubber film and which at the same time is capable of being heat-sealed.

It is an object of this invention to provide an integral unsupported film which has high strength, tear-resistance and elasticity over a wide range of temperatures and which has an unvulcanized surface capable of being heat-sealed by conventional means.

Another object is to provide an integral unsupported film which has the overall physical properties and resistance to moderately high temperatures characteristic of a vulcanized rubber but which is capable of being bonded to itself by the application of heat and pressure alone.

Another object is to provide a unitary unsupported film comprising vulcanized butadiene-acrylonitrile copolymer rubber which can be heat-sealed to give a bond having a tear strength equal to or greater than the strength of the film itself.

Other objects will be apparent from the description and drawings which follow.

Unsupported films of thermoplastic materials are widely known and used for a variety of purposes, one of their important advantages being that they are capable of being heat-sealed without the necessity for use of any extraneous adhesive or cement. However, such films, in order to be heat-sealable, have necessarily been thermoplastic in nature, i. e., they soften and lose their strength when heated to temperatures above about 100°–200° F. In addition, such films generally lack toughness and tear-resistance and are susceptible to punctures. Moreover, they have a tendency to flow and to acquire a permanent set even at room temperatures.

The present invention provides a heat-sealable film which overcomes these disadvantages. The embodiments shown in the appended drawing are intended as illustrations of the nature of the invention and not as limitations upon its scope.

In the drawing:

Fig. 1 is a sectional view of an embodiment of the invention in which one face only of the film is heat-sealable; and Fig. 2 is a sectional view of another embodiment in which both faces are heat-sealable.

As shown in the drawings, one embodiment of the film of the present invention is a membrane comprising a vulcanized rubbery composition having a thermoplastic stratum comprising an unvulcanized rubbery material at least at one face thereof.

The vulcanized portion of the film consists of a rubber composition in which the rubber material comprises essentially a rubbery copolymer of an open-chain conjugated diolefin containing from 4 to 8 carbon atoms with an alpha-methylene nitrile. Among the diolefins which may be used are butadiene-1,3; isoprene; 2,3-dimethyl butadiene-1,3; piperylene; 1,2-dimethyl butadiene-1,3; 1-3 dimethyl butadiene-1,3; 1-ethyl butadiene-1,3; and 1,4-dimethyl butadiene-1,3. Any open chain aliphatic nitrile having an alpha-methylene group may be used, preferably one containing from 3 to 6 carbon atoms such as acrylonitrile, methacrylonitrile and ethacrylonitrile. The rubbery copolymers of these monomeric materials are those containing from 40 to 85% by weight of the diolefin, preferably from 50 to 70% by weight, the balance being acrylic nitrile.

In preparing the film the rubbery copolymer is mixed with a vulcanizing agent such as sulfur and any conventional accelerator of vulcanization in the usual manner. Any of the usual pigments, fillers, reinforcing agents, etc. which are commonly employed may also be present in the composition if desired.

The unvulcanized portion of the film shown in Figs. 1 and 2 comprises a rubbery copolymer which may be identical with that present in the vulcanized stratum except that it is not vulcanized, together with a bonding agent such as a chloroethylene polymer. Any of the usual pigments, fillers, dyes, reinforcing agents, etc. as are known to the art may also be included if desired.

The chloroethylene polymers which are present in the unvulcanized portion of the membrane include any polymers made by polymerizing a monomeric material comprising predominantly a chloroethylene having from 1 to 2 chlorine atoms present on one only of the carbon atoms, among which are polymers of vinyl chloride or of vinylidene chloride, or copolymers of these materials with each other or with lesser amounts of other copolymerizable materials containing a single ethylenic linkage such as vinyl acetate, styrene, methyl acrylate, methyl methacrylate, ethyl acrylate, vinyl bromide, vinyl cyanide, vinylidene cyanide, and the like. Of these, high molecular weight polyvinyl chloride, polyvinylidene chloride, and copolymers of vinyl chloride with vinylidene chloride are preferred.

It has been found that the unvulcanized rubbery copolymer, when homogeneously mixed with the chloroethylene polymer, serves to plasticize the latter so that no additional plasticizer is necessary. However, any of the usual plasticizers for vinyl resins, of which many are known and widely available, may be added if desired in order to obtain a softer product. Among the plasticizers which have been shown to be particularly satisfactory are liquids such as tricresyl phosphate, dibutyl phthalate, dioctyl phthalate, and dibutyl sebacate.

Although any desired proportions of the unvulcanized rubbery copolymer and of the chloroethylene polymer may be employed in the sealing stratum, it has been found that best results are obtained using from about 10 to 60 parts by weight of the rubbery copolymer for 90 to 40 parts of chloroethylene polymer in a total of 100 parts of polymeric material.

The film of the present invention is made by mixing the desired rubbery copolymer with vulcanizing agent, accelerator, and any other desired compounding ingredients in the usual manner, as in an internal mixer or on a roll mill. The composition is then formed into a thin sheet or film, as on a calender. A typical example of a suitable composition is as follows:

| | Parts by weight |
|---|---|
| Butadiene - 1,3 acrylonitrile copolymer (67:33) | 100 |
| Channel black | 50 |
| Zinc oxide | 5 |
| Age resister (phenyl beta - naphthylamine) | 1.5 |
| Cottonseed fatty acids | 1.5 |
| Accelerator (mercaptobenzothiazole) | 1.5 |
| Sulfur | 2.0 |

The desired chloroethylene polymer composition is then prepared in the usual manner and likewise sheeted out on a calender. A typical example of this composition is as follows:

| | |
|---|---|
| Butadiene - 1,3 acrylonitrile copolymer (67:33) | 60.0 |
| High molecular weight polyvinyl chloride | 40.0 |
| Channel black | 50.0 |
| Age resister (phenyl beta naphthylamine) | 1.0 |

The two films or sheets thus formed are brought together in face-to-face relation as shown in Figs. 1 or 2 while still hot as they leave the calenders and are passed between squeeze rolls. This operation suffices to bond the two films together into a single integral film. If desired, the films or sheets to be bonded may be allowed to cool to room temperature before being placed together with equally good results. In this case, however, the full strength of the bond is not developed until after the subsequent heating step required for vulcanization. The bond strength in either case is such that the finished film cannot be separated into its originally distinct components without tearing.

The integral structure is then heated at 300° F. for 30 minutes to vulcanize the stratum containing vulcanizing agent.

If desired, the films may be prepared by casting from a solution or dispersion containing the desired components and in some cases it is advantageous to proceed in this manner. The film may also be prepared by extrusion.

The finished film is resilient, elastic, tough and highly tear resistant, resembling a vulcanized rubber film or sheet in its overall properties. In addition, it can readily be heat-sealed in any conventional manner. For example, the heat-sealable faces of the film may be pressed together between the electrodes of a high frequency electrostatic heating device and subjected to the electrostatic field in the usual way. Surprisingly enough, the film itself will tear through before the bond so produced yields.

The thickness of the film or of the heat-sealable stratum is not critical. Satisfactory film has been made having a total thickness of 0.005 in. or less, and the film may be 0.015 to 0.020 in. thick or even as much as 0.100 in. thick or thicker. Each heat-sealable stratum of the film is preferably from one-tenth to one-half the thickness of the vulcanized stratum for most satisfactory results.

An alternative method of construction is to deposit the heat-sealable stratum upon the face of the vulcanizable rubbery copolymer film prior to vulcanization from an aqueous dispersion or latex containing the rubbery copolymer and the chlorothylene polymer in the desired proportions. The latex may be applied by any desired method, as by spraying, brushing or spreading. The latex deposit may be dried in a separate operation prior to vulcanization of the substratum, or the drying and vulcanization steps may be combined.

Even better tear resistance in the film may be obtained by applying a very thin coating of a polymer or copolymer comprising predominantly vinylidene chloride, particularly copolymers containing from 70% to 90% by weight of copolymerized vinylidene chloride, to the outer face of the heat-sealable stratum. Excellent results have been obtained, for example, with a copolymer of vinylidene chloride, vinyl chloride and methyl acrylate (7:1:1). This coating is preferably applied from an aqueous dispersion or latex on the outer face of the stratum containing unvulcanized rubbery copolymer and may be applied either before or after vulcanization of the vulcanizable substratum. This coating, which comprises essentially the desired vinylidene chloride copolymer, is preferably very thin, ranging from 0.0002 inch in thickness up to about 0.002 inch, and bonds to the face of the heat-sealable stratum to form an integral part of the finished film. When such a coating is employed it is found that the tear resistance of the film, which is weakest along the edges of heat-sealed bonds, is double that of the same film without such coating, and in addition the film possesses increased resistance to the diffusion of petroleum hydrocarbon liquids therethrough. Such a coated film, therefore, is especially valuable for uses where it will come into contact with petroleum hydrocarbons such as gasoline or fuel oil.

Although particular embodiments of the invention have been described we do not intend to limit ourselves solely thereto but to include all of the obvious variations and modifications within the scope of the appended claims.

We claim:

1. A unitary unsupported heat-sealable film comprising a rubbery polymer of an open chain conjugated diolefin with an alpha-methylene nitrile, said polymer being vulcanized in one stratum of said film and being unvulcanized in a stratum at least at one face of said film, said unvulcanized stratum comprising, in homogeneous admixture with said rubbery polymer, a polymer of a monomeric material comprising predominantly a chloroethylene having from one to two chlorine atoms on one only of the carbon atoms.

2. A unitary unsupported heat-sealable film comprising a rubbery polymer of butadiene-1,3 with acrylonitrile, said polymer being vulcanized in one stratum of said film and being unvulcanized in a stratum at least at one face of said film, said unvulcanized stratum comprising, in homogeneous admixture with said rubbery polymer, a polymer of a monomeric material comprising predominantly a chloroethylene having from one to two chlorine atoms on one only of the carbon atoms.

3. A unitary unsupported heat-sealable film comprising a rubbery polymer of butadiene-1,3 with acrylonitrile, said polymer being vulcanized in one stratum of said film and being unvulcanized in a stratum at least at one face of said film, said unvulcanized stratum comprising, in homogeneous admixture with said rubbery polymer, a polymer of a monomeric material comprising predominantly vinyl chloride.

4. A unitary unsupported heat-sealable film comprising a rubbery polymer of butadiene-1,3 with acrylonitrile, said polymer being vulcanized in one stratum of said film and being unvulcanized in a stratum at least at one face of said film, said unvulcanized stratum comprising, in homogeneous admixture with said rubbery polymer, a polymer of a monomeric material comprising predominantly vinylidene chloride.

5. A unitary unsupported heat-sealable film comprising a rubbery polymer of butadiene-1,3 with acrylonitrile, said polymer being vulcanized in one stratum of said film and being unvulcanized in a stratum at least at one face of said film, said unvulcanized stratum comprising, in homogeneous admixture with said rubbery polymer high molecular weight polyvinyl chloride.

6. The film of claim 1 in which said unvulcanized stratum occurs at each face of said film.

7. The film of claim 2 in which said unvulcanized stratum occurs at each face of said film.

8. The film of claim 3 in which said unvulcanized stratum occurs at each face of said film.

9. The film of claim 4 in which said unvulcanized stratum occurs at each face of said film.

10. The film of claim 5 in which said unvulcanized stratum occurs at each face of said film.

11. The film of claim 2 in which the outer face of said unvulcanized stratum has a thin coating integral therewith comprising essentially a polymer of a monomeric material comprising predominantly vinylidene chloride.

12. The film of claim 3 in which the outer face of said unvulcanized stratum has a thin coating integral therewith comprising essentially a polymer of a monomeric material comprising predominantly vinylidene chloride.

13. The film of claim 10 in which the outer face of each unvulcanized stratum has a thin coating integral therewith comprising essentially a polymer of a monomeric material containing 70 to 90% by weight of vinylidene chloride.

14. The method of making a unitary heat-sealable resilient rubbery film which comprises providing a membrane comprising a rubbery polymer of an open-chain conjugated diolefin with an alpha-methylene nitrile and containing a vulcanizing agent therefor, applying to at least one face of said membrane a stratum free from vulcanizing agent comprising a homogeneous mixture of a rubbery polymer of said diolefin and said nitrile with a polymer of a monomeric material comprising predominantly a chloroethylene having from one to two chlorine atoms on one only of the carbon atoms to form a unitary film, and heating said film to vulcanize said membrane.

15. The method of making a unitary heat-sealable resilient rubbery film which comprises providing a membrane comprising a rubbery polymer of butadiene-1,3 with acrylonitrile and a vulcanizing agent therefor, applying to at least one face thereof a stratum free from vulcanizing agent comprising a homogeneous mixture of said rubbery polymer and a polymer of a monomeric material comprising predominantly a chloroethylene having from one to two chlorine atoms on one only of the carbon atoms to form an integral unitary film, and heating said film to vulcanize said membrane.

EDWIN M. MAXEY.
CARROLL P. KRUPP.

REFERENCES CITED

The following references are of record in the file of this patent:

UNITED STATES PATENTS

| Number | Name | Date |
|---|---|---|
| 1,096,112 | Kush | May 12, 1914 |
| 2,234,621 | Brous | Mar. 11, 1941 |
| 2,278,777 | Garvey et al. | Apr. 7, 1942 |
| 2,323,562 | Nugent | July 6, 1943 |
| 2,411,116 | Sanz | Nov. 12, 1946 |
| 2,430,931 | Hershberger | Nov. 18, 1947 |